Dec. 1, 1936.            J. ASKIN                2,062,857
              REFRIGERANT CONTROL DEVICE
                  Filed March 1, 1934
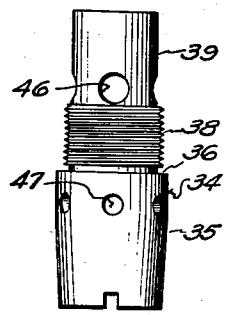
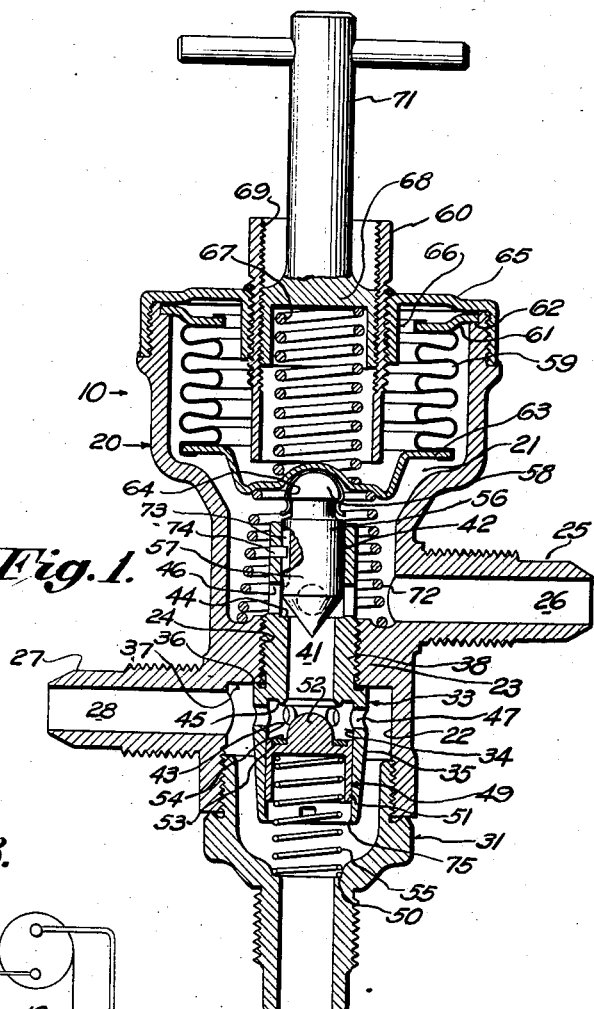
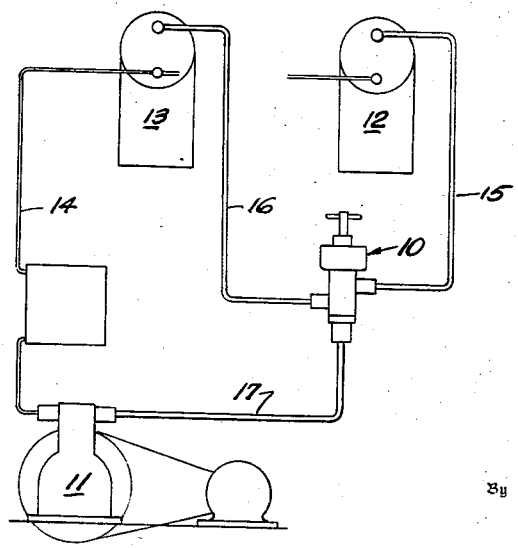
Inventor
Joseph Askin
Albert R Henry
Attorney Patented Dec. 1, 1936

2,062,857

UNITED STATES PATENT OFFICE 2,062,857

REFRIGERANT CONTROL DEVICE

Joseph Askin, Buffalo, N. Y., assignor to Fedders Manufacturing Company, Inc., Buffalo, N. Y.

Application March 1, 1934, Serial No. 713,578

7 Claims. (Cl. 137—153)

This invention relates to valve devices for controlling the application of suction pressures to evaporators.

The invention includes an adjustable bellows controlled valve for controlling the suction connection between an evaporator and its compressor, and it also includes a novel check valve for preventing a reverse refrigerant surge from the suction conduit to the evaporator. The latter valve is particularly useful in multiple systems of refrigeration where the back surge condition is aggravated.

More specifically, the invention resides in a unitary valve and seat structure, wherein both of the previously mentioned valves, their seats, and a mounting structure, are easily removable as a unit for replacement or repair.

In the drawing:

Fig. 1 is a vertical section through the valve device;

Fig. 2 is a side elevation of the valve unit body; and

Fig. 3 is a diagrammatic view of a multiple refrigerant circuit wherein is included the valve of the present invention.

The valve device 10 may be applied in a multiple refrigeration system, as illustrated in Fig. 3, wherein a compressor 11 supplies compressed refrigerant to the evaporators 12 and 13 through a common conduit 14. The expanded gases are removed from the evaporators through conduits 15 and 16 respectively, which both communicate with a suction conduit 17 leading to the compressor. The valve device is formed with fittings, as hereinafter described, affording a direct connection between one evaporator 13 and the suction conduit 17. A pressure controlled connection is also included in the valve device for controlling the suction pressures in the remaining evaporator 12, and as a result, the evaporator 13 may be operated at a lower temperature, although both evaporators are in the same circuit.

The valve device comprises a housing 20 which is formed with open coaxial bellows and output chambers 21 and 22 respectively, which are separated by a wall 23 containing a tapped hole 24. Communication between the conduit 15 of the evaporator 12 and the bellows chamber 21 is obtained through a threaded fitting 25 having a radial passage 26, while the conduit 16 of the evaporator 13 is connected to the output chamber 22 through a similar fitting 27 containing a radial passage 28. The suction conduit 17 also communicates with the chamber 22, and by means of a coupling nut 31 which is threaded into the open end of such chamber.

A valve and seat assembly is provided which is devised as a connected unit 33, and it may be removed through the open end of the chamber after the nut 31 has been removed. The unit comprises a cylindrical body 34 formed exteriorly with an enlarged cylindrical portion 35 terminating in a shoulder 36 having a circular knife edge for engaging in sealed relation the bottom wall 37 of the chamber 22. Adjacent the shoulder 36, the body is formed with a reduced threaded portion 38 adapted to be engaged in the tapped hole 24 of the housing wall 23. The remaining portion of the body is further reduced in diameter to form a valve guide portion 39 which projects into the chamber 21.

The body 34 contains a refrigerant passage 41 at its central axial portion, while its opposite ends are formed with coaxial openings of enlarged diameter, providing an expansion valve guide opening 42, and a check valve guide opening 43. The shouldered internal extremities of the openings 42 and 43 form seats 44 and 45, the latter seat comprising a raised circular edge. A plurality of ports 46 and 47 are drilled radially through the body 34 adjacent the seats 44 and 45 respectively.

The lower seat 45 receives a check valve 49 which is of the flat type and formed with a cylindrical skirt 51 which is slidably received in the opening 43, and a hemispherical guide head 52 which is adapted to enter the passage 41. The face of this valve contains a circular groove 53 for receiving a valve insert 54 of a relatively soft material which permits a slight embedment of the seat 45. The use of lead or a lead alloy for the insert 54 is to be preferred for refrigeration purposes. The valve 49 is urged toward its seat 45 by a light spring 55, one end of which is received within the skirt 51 with the remaining end mounted in a circular saddle 50 formed in the coupling nut 31.

The upper or expansion valve 56 is of the pointed type and its shank 57 is axially guided in the opening 42 and terminates in a head portion 58. The valve 56 is operated by a bellows 59 which is provided with an annular flange 61 at its open end which is soldered in a shoulder 62 at the upper extremity of the chamber 21. The lower end of the bellows is closed by a head plate 63 to which a spring clip 64 is secured and which is adapted to engage resiliently over the head portion 58 of the valve 56.

A cap member 65 is secured over the open end of the bellows 59 and it contains a central annular flange 66 which is tapped to receive adjustably a tubular sleeve 60. This sleeve projects into the bellows and serves as a stop member for limiting the upward movement of the bellows.

A spring 67 is provided for applying an adjustable load to the bellows 59, and it is mounted between the head plate 63 and a nut 68, which is engaged in an internal threaded portion 69 in the sleeve 66. The nut is formed with a handle portion 71 for facilitating adjustment. A second spring 72 is mounted between the head plate 63 and the bottom of the chamber 21, and it provides a fixed compression load on the bellows, against which the load of the spring 67 is adjusted.

It will be observed that although both valves are movably mounted in the body 34, the axial movement thereof is limited to prevent detachment of the valves during removal of the unit for repair or replacement. The expansion valve 56 is slidably keyed to the body, having a keyway 73 for receiving a pin 74 secured in the body 34, while the check valve 49 is retained in its guide by peening the extremity of the guide opening 43, as indicated by the numeral 75.

It will also be noted that upon assembly of the unit valve 33 with the housing 20, the head 58 of the valve 56 enters and is retained by the spring clip 64 which serves to insure opening movement of the valve. By this means the possibility of a sticking valve is overcome.

In operation, the suction pressures in the conduit 17 are always responsive to temperature conditions in the evaporator 13, inasmuch as the operation of the compressor 11 is controlled thereby through the familiar control switch apparatus. Insofar as the conduits 16 and 17 are concerned, the valve device simply provides a coupling therebetween. However, the connection between the conduits 15 and 17 is directly controlled in the valve device by the operation of the bellows 59, which, being responsive to a predetermined pressure condition in the evaporator 12, controls the opening and closing movement of the valve 56 and thus retains the suction back pressure in the evaporator 12 at a predetermined lower pressure than in the evaporator 13.

The occasional entry of ungasified refrigerant into the conduit 16, coupled with a subsequent "off-cycle" of the compressor motor, results at times in the building up of relatively positive gauge pressures in the suction portions of the circuit, and it has been found desirable to protect the controlled evaporator (the evaporator 12) from the higher pressures and the resulting temporary temperature rise. The check valve 49, during such unusual conditions, is immediately forced to its seat, thus isolating the evaporator 12 from the conduit 17 until normal suction pressures are restored, whereupon the check valve is forced open by the gas seeking escape through the passage 41.

I claim:

1. A pressure control valve comprising, a valve seat therein, a valve for said seat, fluid inlet and outlet passages disposed on opposite sides of the seat, a bellows in said housing secured to said valve, a passage connecting said fluid inlet with the housing containing said bellows, whereby said bellows is responsive to pressure variations in said inlet to operate said valve, a valve seat in the outlet passage, an impervious check valve thereon, said passage being formed with a chamber surrounding said check valve and its seat, resilient means for urging said check valve towards its seat, and a branch connection connecting with said chamber, whereby flow through said branch connection will pass directly to said outlet and exert a balanced pressure on said check valve.

2. A pressure control device comprising a housing formed with fluid inlet and outlet chambers and a wall therebetween, a valve mounting body removably secured to the wall and extending therethrough, a passage through the body, valve seats formed in the body at opposite ends of the passage, independently mounted outwardly opening valves on the seats, guide means for the valves on the body, a bellows in the inlet chamber connected to the adjacent valve, said bellows being responsive to fluid pressure variations in the inlet passage to operate its valve, and resilient means for retaining the remaining valve on its seat.

3. A pressure control device comprising a housing formed with fluid inlet and outlet chambers and a wall therebetween, a valve mounting body removably secured to the wall and extending therethrough, a passage through the body, valve seats formed in the body at opposite ends of the passage, independently mounted outwardly opening valves on the seats, guide means on the body for receiving each valve for axial movement, means for retaining each valve in its guide means, a bellows in the inlet chamber connected to the adjacent valve, said bellows being responsive to pressure variations in the inlet passage to operate its valve, and resilient means for retaining the remaining valve on its seat.

4. A pressure control device comprising a housing formed with fluid inlet and outlet chambers and a wall therebetween, a valve mounting body removably secured to the wall and extending therethrough, a passage through the body, valve seats formed in the body at opposite ends of the passage, outwardly opening valves on the seats, guide means on the body for receiving each valve for axial movement, means for retaining each valve in its guide means, a bellows in the inlet chamber, a spring clip secured thereto and adapted to resiliently engage the adjacent valve, said bellows being responsive to pressure variations in the inlet passage to operate said adjacent valve, and resilient means for retaining the remaining valve on its seat.

5. As an article of manufacture, a valve unit for a pressure control device comprising a cylindrical body exteriorly threaded to provide a connection means to a control device, said body being formed with an axial passage and enlarged counterbores at each extremity thereof providing valve guide openings, valve seats formed in the body at each extremity of the passage, radial ports in the guide openings of the body adjacent said seats, a valve independently mounted on each seat, each valve having a cylindrical portion axially guided in its respective guide opening, one of said valves having its cylindrical portion formed to cover the radial ports in its guide opening, thereby providing a sleeve valve, and means for retaining each valve in its guide opening.

6. A pressure control valve comprising a housing formed with an enlarged chamber at one end, a bellows secured in said chamber, a valve detachably connected to said bellows and disposed at substantially the axis of said chamber and housing, lateral passages formed on said housing, a valve seat disposed between said passages, said valve seat being adapted to receive said valve, whereby said passages may be disconnected from each other, a second chamber formed at the opposite end of said housing, said second chamber being aligned with said first named chamber, a check valve in said chamber, said check valve being adapted to close communication between said passages, a cap for said chamber, a spring in said cap bearing against said check valve, a branch connection leading into said chamber, and an outlet passage formed in said cap.

7. In a refrigeration system having a pair of evaporators, a control valve for the evaporators comprising a valve body formed with a pair of separate chambers, a refrigerant suction conduit for one of said evaporators entering one of said chambers, an outlet conduit for the remaining evaporator entering the other of said chambers, a valve in the second chamber adapted to close a valve in the second chamber adapted to close said passage, pressure responsive means in the second chamber for controlling said valve, and a check valve in the first named chamber adapted to close said passage when the pressure in the first chamber becomes greater than the pressure in the second chamber.

JOSEPH ASKIN.